United States Patent
Piaskowski et al.

(10) Patent No.: US 6,613,133 B2
(45) Date of Patent: Sep. 2, 2003

(54) SINGLE SPRAY LEVEL FOR FLUE GAS DESULFURIZATION SYSTEM WITH INTERNAL MAIN FEED HEADERS

(75) Inventors: Edward J. Piaskowski, Massillon, OH (US); Norman D. Nelson, Franklin Township, OH (US)

(73) Assignee: The Babcock & Wilcox Company, New Orleans, LA (US)

( * ) Notice: Subject to any disclaimer, the term of this patent is extended or adjusted under 35 U.S.C. 154(b) by 43 days.

(21) Appl. No.: 09/969,333

(22) Filed: Oct. 1, 2001

(65) Prior Publication Data

US 2003/0061940 A1 Apr. 3, 2003

(51) Int. Cl.$^7$ ............................................... B01D 47/06
(52) U.S. Cl. ...................... 96/322; 95/235; 261/116; 261/117; 239/556; 239/565
(58) Field of Search .......................... 95/235; 96/322; 261/115, 116, 117, 118; 239/556, 557, 565

(56) References Cited

U.S. PATENT DOCUMENTS

| | | | |
|---|---|---|---|
| 1,430,696 A | * | 10/1922 | Smith |
| 3,887,131 A | * | 6/1975 | Bourne |
| 5,173,093 A | * | 12/1992 | Johnson et al. |
| 5,271,873 A | * | 12/1993 | Nelson et al. |
| 5,620,144 A | * | 4/1997 | Strock et al. |
| 6,007,604 A | * | 12/1999 | Risse |
| 6,017,384 A | * | 1/2000 | Risse |
| 6,102,377 A | * | 8/2000 | Doughty |

* cited by examiner

Primary Examiner—Duane S. Smith
(74) Attorney, Agent, or Firm—Eric Marich

(57) ABSTRACT

A spray level arrangement for spraying a liquid absorbent into flue gas flowing through a flue gas desulfurization absorber tower having a shell, includes a pair of elongated headers each having an inlet end for receiving liquid absorbent outside the shell, and an opposite end supported by a shell support at the inner surface of the shell. Each header extends through a penetration port of the shell and into the interior of the shell for supplying the liquid absorbent to the tower. A plurality of elongated branch lines are secured to each header and extend within the tower, each branch line having a supply end connected to the header and an opposite end supported on their own shell supports at the inner surface of the shell. A plurality of nozzles are secured to each branch. The nozzles are configured to spray the liquid absorbent into the flue gas within the tower. A beam in the shell has straps for further supporting the headers in the shell, if required.

18 Claims, 1 Drawing Sheet

SINGLE SPRAY LEVEL FOR FLUE GAS DESULFURIZATION SYSTEM WITH INTERNAL MAIN FEED HEADERS

FIELD AND BACKGROUND OF THE INVENTION

The present invention relates in general to flue gas purification and, in particular, to a new and useful flue gas desulfurization system.

Flue gas desulfurization occurs primarily in a flue gas absorber tower by means of spraying the flue gas with a mixture which causes the sulfur to precipitate out. The spraying system can typically be a series of interspatial headers as described in U.S. Pat. No. 5,173,093. In this arrangement, the main feed headers are arranged and located externally to the absorber tower. This patent produces better coverage of sprays with an absorber tower of reduced height. However, the external header main feeds present support and flexibility problems and require numerous branch header penetrations through the absorber tower.

SUMMARY OF THE INVENTION

The present invention improves on the prior art by eliminating the external main feed headers and their associated supports and eliminating the numerous branch line penetrations through the absorber tower shell.

According to the present invention, the main feed headers are routed through the absorber shell in just two locations and arranged internally to the absorber such that the supports are internal and the branch headers are still arranged in a manner to provide an interspatial arrangement, such that full spray coverage is accomplished even if feed to one main feed header is interrupted.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated

DESCRIPTION OF THE PREFERRED EMBODIMENT

Figure 1:
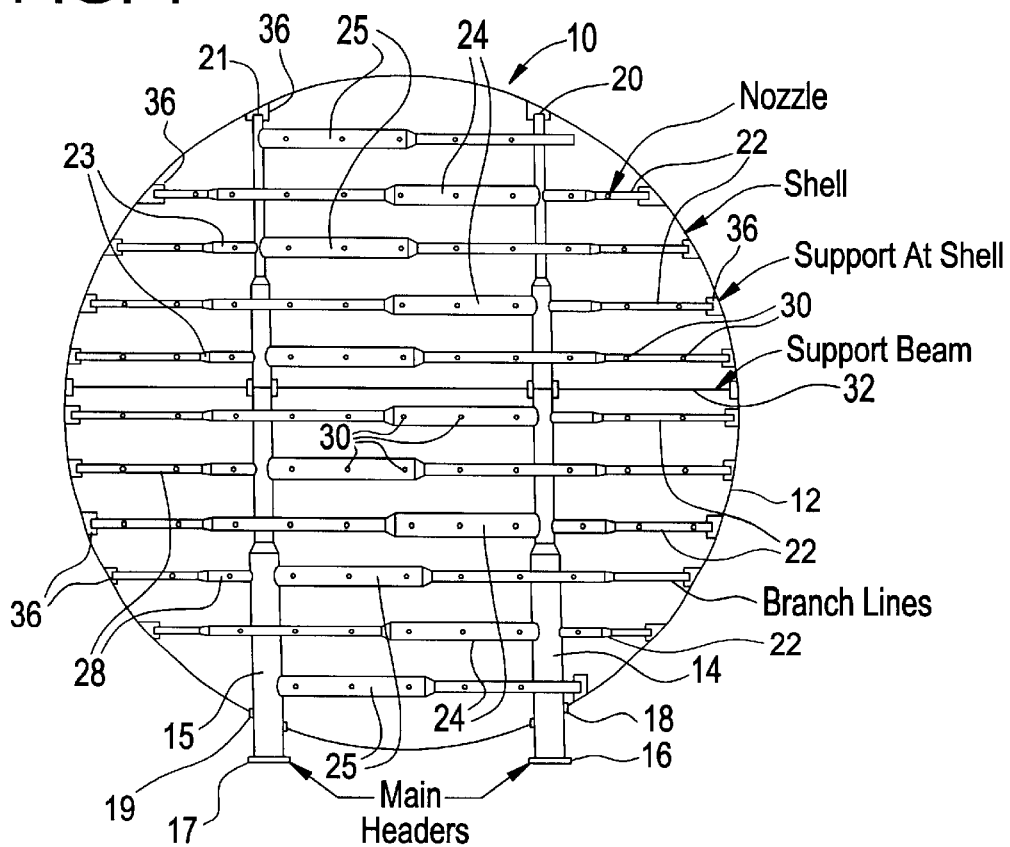
FIG. 1 is a top plan view of a single spray level for a desulfurization system according to the present invention.
Figure 2:
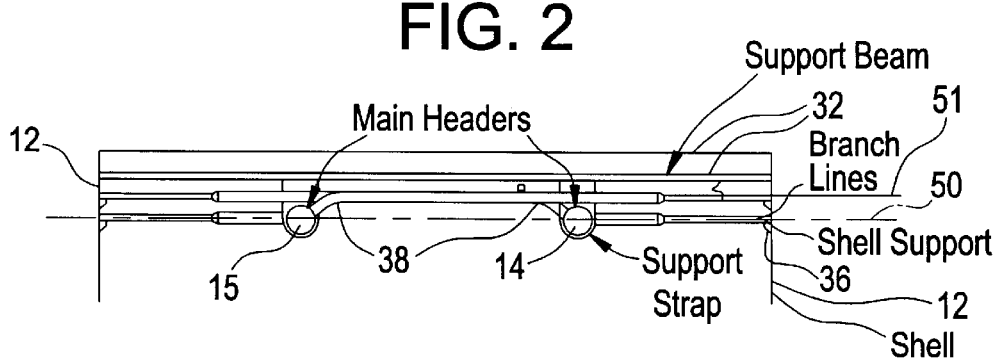
FIG. 2 is a side elevational view thereof, partly in section.

Referring to the drawings in general, wherein like reference numerals designate the same or functionally similar parts, and to FIGS. 1 and 2 in particular, the present invention embodied therein comprises a spray level arrangement 10 for spraying a liquid absorbent onto flue gas flowing through a flue gas desulfurization absorber tower having a shell 12. The spray level arrangement is at a spray level in the tower. For additional details see U.S. Pat. No. 5,173,093 to Johnson et al. for SINGLE SPRAY LEVEL FOR FLUE GAS DESULFURIZATION SYSTEM, the text of which is hereby incorporated by reference as though fully set forth herein.

The spray level arrangement 10 comprises at least one but preferably two or more elongated headers 14 and 15 each having an inlet end 16 and 17 for receiving liquid absorbent outside the shell. Each header extends through a penetration port 18 and 19 of the shell 12, into the interior of the shell for supplying the liquid absorbent to the tower.

Figure 4:
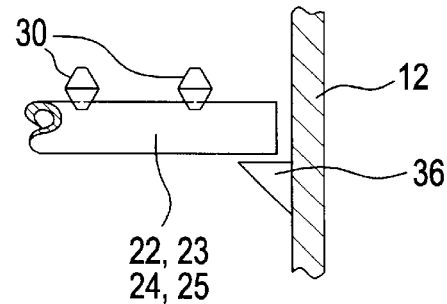
FIG. 4 is a side elevational view, partly in section, showing support at the end of the headers and end of branch lines connected to the headers.

A plurality of elongated branch lines 22-25 are secured to the headers and extend within the tower, each branch line having a supply end connected to its header and an opposite end supported on a shell support 36 as shown in FIG. 4. In cases where branch lines have a short overhang, shell supports 36 may not be required. A plurality of nozzles 30 are secured to each branch, the nozzles being configured to spray the liquid absorbent onto the flue gas within the tower.

Figure 3:
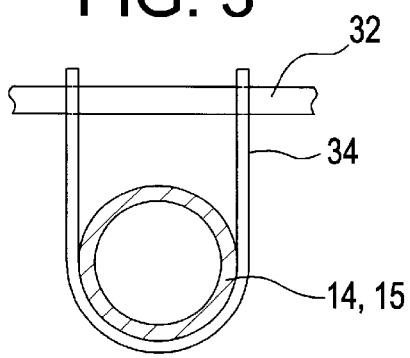
FIG. 3 is an enlarged side elevational view, partly in section showing the arrangement for hanging the main headers according to the present invention.

Shell supports like supports 36, also support the opposite closed ends 20 and 21 of the headers 14 and 15, and form part of the supporting means for the headers and the branch lines at the spray level in the tower. Main support and a main part of the support means may be provided (if required) by one or more cross beams 32 extending across the shell interior near the diameter of the shell, and support straps 34 which extend around the headers and have top end connected to one of the beams as shown in FIG. 3.

As best shown in FIG. 2, the branch lines include stub lines 22 and 23 which are straight and extend directly from the respective header 14, 15, and lie in a lower plane 50 at the spray level, and bent inwardly extending branch lines 24 and 25 which each contain a bend 38 and initially extend in an upwardly inclined manner from the respective header and then bend to extend in a second horizontal plane 51 outwardly from a respective header toward the shell 12.

The present invention provides means for routing the branch headers past the adjacent main header, such that full spray coverage can be accomplished from either main feed header. In the prior art arrangement, the external main feed headers can, at times, run at different temperatures than the absorber, creating expansion differentials and subsequent flexibility problems and high stresses. Also, an external structure may be needed to support the external main feed headers. The numerous branch penetrations through the absorber are costly, requiring additional pipe spools, flanges, bolts and connections through the absorber shell.

The following advantages are realized by application of the internal main feed header design according to the present invention:

1. Flexibility issues are minimized or eliminated, thereby reducing or eliminating complex flexibility analysis.
2. Support of external main feed pipes is simplified due to shorter runs of piping, with less bends, fewer support points and reduced need for structural support steel in an elevated area of the absorber tower.
3. Numerous components are eliminated or reduced, including pipe spools, flanges, bolts, nozzles, header reinforcement, expansion joints, etc.
4. Precise matching of the connections on the main headers with the connections on the absorber tower is no longer an issue with this design.
5. Field construction is simplified in that temporary main header supports are minimized or eliminated, and fewer pieces need to be erected and bolted or welded.

While a specific embodiment of the invention has been shown and described in detail to illustrate the application of the principles of the invention, it will be understood that the invention may be embodied otherwise without departing from such principles.

We claim:

1. A spray level arrangement for spraying a liquid absorbent onto flue gas flowing through a flue gas desulfurization absorber tower having a shell, the spray level arrangement being at a spray level in the tower and comprising:

at least one elongated header having an inlet end for receiving liquid absorbent outside the shell, the header extending through a penetration port of the shell, into the interior of the shell for supplying the liquid absorbent to the tower;

a plurality of elongated branch lines secured to said header and extending within the tower, each branch line having a supply end connected to the header and an opposite end;

a plurality of nozzles secured to each branch, said nozzles being configured to spray the liquid absorbent onto the flue gas within said tower; and shell supports at inner surfaces of the shell supporting each opposite end of the elongated branch lines at the spray level in the tower.

2. The arrangement according to claim 1, wherein said at least one elongated header comprises an opposite end in the shell, said means for supporting including a shell support on an inner surface of the shell for supporting the opposite end of the header.

3. The arrangement according to claim 1, further comprising at least one beam extending across an interior of the shell and at least one strap connected to the beam and engaged under the header.

4. The arrangement according to claim 1, wherein the branch lines comprise at least one branch line having a bend therein and a horizontal portion so that the horizontal portion of the branch line extends at a different plane from a plane containing the header.

5. The arrangement according to claim 1, comprising a plurality of elongated headers, each having an inlet end outside the shell and each extending through a penetrations port into the shell.

6. The arrangement according to claim 5, further comprising one beam extending in the interior of the shell and a strap connected to the beam and extending under each header.

7. The arrangement according to claim 6, wherein the header and each branch line comprise different diameter portions with a large diameter portion of each branch line being closest to the inlet end of the header.

8. The arrangement according to claim 1, wherein the header and each branch line comprise different diameter portions with a large diameter portion of each branch line being closest to the inlet end of the header.

9. The arrangement according to claim 8, wherein said at least one elongated header comprises an opposite end in the shell, and a shell support on an inner surface of the shell for supporting the opposite end of the header.

10. The arrangement according to claim 8, further comprising at least one beam extending across an interior of the shell and at least one strap connected to the beam and engaged under the header.

11. The arrangement according to claim 8, wherein the branch lines comprise at least one branch line having a bend therein and a horizontal portion so that the horizontal portion of the branch line extends at a different plane from a plane containing the header.

12. A spray level arrangement for spraying a liquid absorbent onto flue gas flowing through a flue gas desulfurization absorber tower having a shell, the spray level arrangement being at a spray level in the tower and comprising:

at least one elongated header having an inlet end for receiving liquid absorbent outside the shelf and a header opposite end inside shell, the header extending through a penetration port of the shell into the interior of the shell for supplying the liquid absorbent to the tower;

a plurality of elongated branch lines secured to said header and extending within the tower, each branch line having a supply end connected to the header and a branch opposite end;

a plurality of nozzles secured to each branch, said nozzles being configured to spray the liquid absorbent onto the flue gas within said tower; and shell supports at inner surfaces of the shell supporting each header opposite end in the tower.

13. The arrangement according to claim 12, further comprising at least one beam extending across an interior of the shell and at least one strap connected to the beam and engaged under the header.

14. The arrangement according to claim 12, wherein the header and each branch line comprise different diameter portions with a large diameter portion of each branch line being closest to the inlet end of the header.

15. The arrangement according to claim 12, wherein the branch lines comprise at least one branch line having a bend therein and a horizontal portion so that the horizontal portion of the branch line extends at a different plane from a plane containing the header.

16. A spray level arrangement for spraying a liquid absorbent onto flue gas flowing through a flue gas desulfurization absorber tower having a shell, the spray level arrangement being at a spray level in the tower and comprising:

at least one elongated header having an inlet end for receiving liquid absorbent outside the shell and a header opposite end inside shell, the header extending through a penetration port of the shell into the interior of the shell for supplying the liquid absorbent to the tower;

a plurality of elongated branch lines secured to said header and extending within the tower, each branch line having a supply end connected to the header and a branch opposite end;

a plurality of nozzles secured to each branch, said nozzles being configured to spray the liquid absorbent onto the flue gas within said tower; and means for supporting the header opposite end and branch opposite ends at inner surfaces of the shell in the tower.

17. The arrangement according to claim 16, wherein the header and each branch line comprise different diameter portions with a large diameter portion of each branch line being closest to the inlet end of the header.

18. The arrangement according to claim 16, wherein the branch lines comprise at least one branch line having a bend therein and a horizontal portion so that the horizontal portion of the branch line extends at a different plane from a plane containing the header.

* * * * *